United States Patent
In et al.

(10) Patent No.: US 8,180,353 B2
(45) Date of Patent: May 15, 2012

(54) ROUTING METHOD AND SYSTEM FOR MOBILE AD-HOC NETWORK

(75) Inventors: Jeong Sik In, Yongin-si (KR); Hyo Hyun Choi, Seoul (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 737 days.

(21) Appl. No.: 12/323,567

(22) Filed: Nov. 26, 2008

(65) Prior Publication Data
US 2009/0135764 A1 May 28, 2009

(51) Int. Cl.
H04W 74/00 (2009.01)
H04W 4/00 (2009.01)
H04L 12/28 (2006.01)

(52) U.S. Cl. .................. 455/445; 370/328; 370/400

(58) Field of Classification Search .............. 455/445; 370/328, 400
See application file for complete search history.

(56) References Cited

U.S. PATENT DOCUMENTS

| 7,570,600 | B1 * | 8/2009 | Slaughter et al. | 370/254 |
| 2002/0181402 | A1 * | 12/2002 | Lemoff et al. | 370/238 |
| 2005/0047390 | A1 * | 3/2005 | Park et al. | 370/351 |
| 2008/0062916 | A1 * | 3/2008 | Mosko et al. | 370/328 |

* cited by examiner

Primary Examiner — Ariel Balaoing
(74) Attorney, Agent, or Firm — Cha & Reiter, LLC (57) ABSTRACT

A routing method and system for a mobile ad-hoc network is provided for efficiently routing a packet by quickly updating topology information shared by nodes adaptively to variation of the network topology while minimizing generation of redundant traffic. The routing method includes setting, at each current node, a self-potential value to a destination node upon receiving a route recovery request; and transmitting, when a transmission packet is destined to the destination node, the packet through a route established with at least one node in a descending order of potential value. The present invention reduces the redundant traffic dramatically, thereby improving the entire network throughput.

19 Claims, 11 Drawing Sheets

ROUTING METHOD AND SYSTEM FOR MOBILE AD-HOC NETWORK

CLAIM OF PRIORITY

This application claims priority under 35 U.S.C. §119 from an application entitled "ROUTING METHOD AND SYSTEM FOR MOBILE AD-HOC NETWORK" filed in the Korean Intellectual Property Office on Nov. 26, 2007 and assigned Serial No. 2007-0120661, the contents of which are incorporated herein by reference in its entirety.

BACKGROUND OF THE INVENTION

1. Field of the Invention

The present invention relates to a mobile ad-hoc network. More particularly, the present invention relates to a routing method and system for a mobile ad-hoc network that efficiently routes a packet by quickly updating topology information shared by nodes adaptively to variation of the network topology while minimizing generation of redundant traffic.

2. Description of the Related Art

In dynamic networks such as wireless ad-hoc network, each node acts as a mobile router and is free to move about arbitrarily. The reason that such movement is permissible is that information transmitted on networks having a topology such as the wireless ad-hoc network permits the nodes outside the wireless transmission range of each to be capable of communicating with each other via multiple hops.

In such networks, the network topology dynamically changes as each mobile node moves, whereby the mobile nodes should update their network topology information adaptively to the change of the network topology for effective communication between source and destination nodes by the network having the most current routing information.

In order to manage the routing information, two kinds of signaling are used. One type of signal is broadcasted periodically in order to check for the existence of a link. The second type of signal is an informational signal transmitted to inform of an event such as a change of route. The periodic signaling is inevitable for maintaining the routing scheme such that it cannot be omitted from the ad-hoc network.

Accordingly, the above-mentioned signaling impacts the capacity of the network and reduces the overall efficiency as there is a significant amount of signaling just to check for links and report events. Accordingly, an increase in the signaling efficiency of communication between the nodes and the network itself can be increased by a reduction in the amount of traffic caused by the arbitrary event-driven signaling (i.e., traffic overhead).

Such traffic redundancy is determined according to how frequently the events occur and propagation ranges of the event-driven signals. In the conventional mobile routing schemes, even when a link is changed, the link change information is propagated over the entire network, resulting in traffic redundancy. Such traffic redundancy reduces the network throughput, resulting in instabilities of communication services.

Accordingly, there has been a need for developing a mobile routing method that is capable of minimizing signaling traffic while enabling each node to quickly update information required for recovering a route.

SUMMARY OF THE INVENTION

The present invention has been made in part in an effort to solve at least some of the above problems, and provide the advantages described herein below. In order to reduce the traffic redundancy, the present invention permits minimizing the propagation range of the signaling traffic.

Accordingly, the present invention provides a routing method and system for a mobile ad-hoc network that provides efficient routing of a packet by causing each node to quickly acquire information on the change of network topology, while minimizing traffic redundancy caused by event-driven signals.

In accordance with an exemplary embodiment of the present invention, a routing method for a mobile ad-hoc network, which has one or more mobile nodes, includes setting, at each current node, a self-potential value to a destination node upon receiving a route recovery request; and transmitting, when a transmission packet is destined to the destination node, the packet through a route established with at least one node in a descending order of potential.

In accordance with another exemplary embodiment of the present invention, a mobile terminal as one of mobile nodes establishing a mobile ad-hoc network includes a storage for storing a mobile terminal's potential access to all nodes as destinations; a radio frequency unit for transmitting a signal containing a mobile terminal's potential access to a destination node via neighbor nodes; a potential configuration module for setting a value of the mobile terminal's potential according to a reception of a route recovery request; and a data transmission module for transmitting a packet destined to the destination node through a route established with nodes in a descending order of potential.

BRIEF DESCRIPTION OF THE DRAWINGS

The above and other exemplary objects, features and advantages of the present invention will be more apparent from the following detailed description in conjunction with the accompanying drawings, in which.

DETAILED DESCRIPTION

Exemplary embodiments of the present invention are described herein below to provide a person of ordinary skill in the art an understanding of the invention in conjunction with the accompanying drawings. While the invention is shown and described with reference to certain exemplary embodiments thereof, it will be understood by those skilled in the art that such examples have been provided for illustrative purposes and do not limit the scope of the invention to the examples shown and described. Various changes in form and details may be made therein without departing from the spirit and scope of the invention as defined by the appended claims. Although the invention is described in detail with reference to specific exemplary embodiments thereof, it will be understood that variations which are functionally equivalent are within the scope of this invention.

The same reference numbers are used throughout the drawings to refer to the same or similar parts. Detailed descriptions of well-known functions and structures incorporated herein may be omitted to avoid obscuring appreciation of the subject matter of the present invention by a person of ordinary skill in the art.

For illustrative purposes, the dimensions of some of the elements in the figures may be exaggerated relative to other elements, to help in improving an understanding of exemplary embodiments of the present invention.

In the following description, mobile terminals comprise nodes constituting a mobile ad-hoc network. That is, the mobile ad-hoc network is composed of a plurality of mobile terminals. It should be understood that devices other than mobile terminals may comprise the mobile nodes. In the following examples, the mobile terminals can exchange data with neighbor terminals conveniently using broadcast feature of radio channel. The mobile ad-hoc network is usefully self-configured in a disaster relief situations, military war zones, and personal network and home network environments using its broadcast characteristics. Since the ad-hoc network requires no central node for controlling the network, each node is a host and acts as a router for forwarding data for other nodes. In the following, the term "network" is understood as "mobile ad-hoc network," unless otherwise noted.

Since the mobile nodes of the ad-hoc networks have router functionality, the routing paths are dynamically changed. In the present invention, a concept "potential" is introduced in consideration of the change of network topology and mobility of the node.

Figure 1:
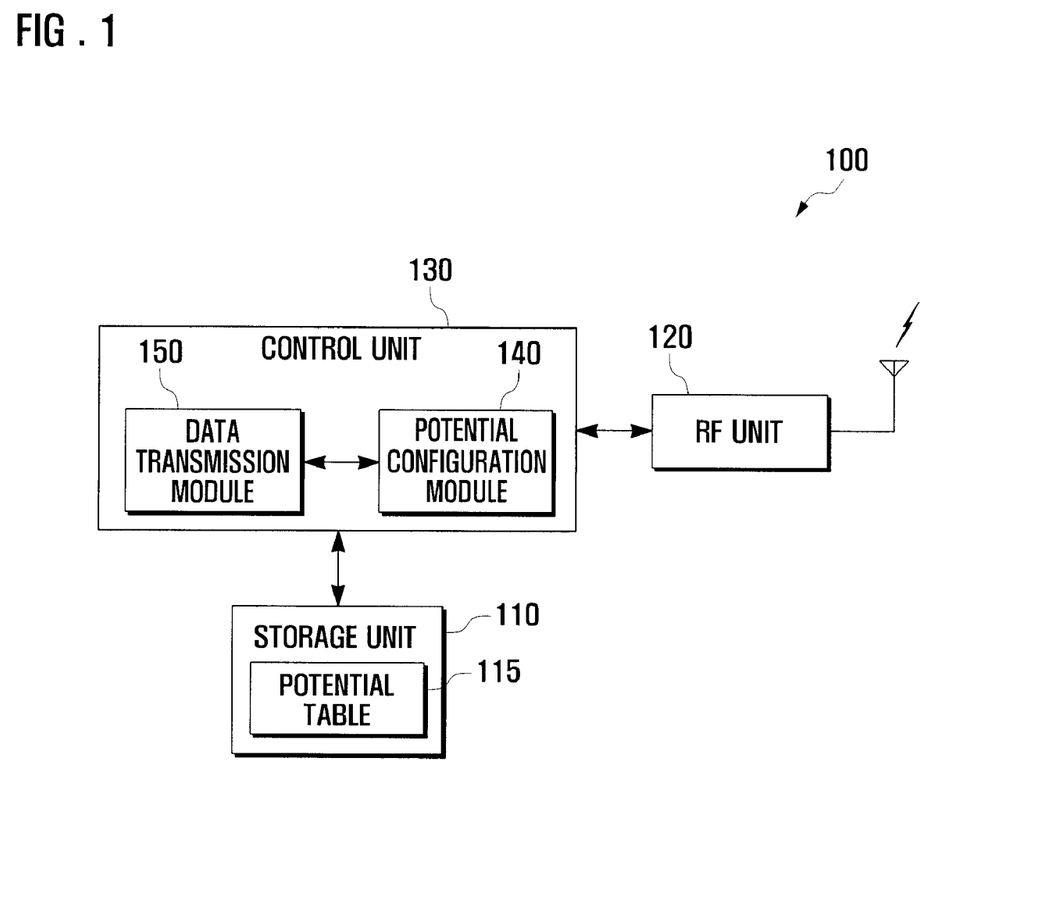
FIG. 1 is a schematic block diagram illustrating a mobile node of an ad-hoc network according to an exemplary embodiment of the present invention.

FIG. 1 is a schematic block diagram illustrating a mobile node of an ad-hoc network according to an exemplary embodiment of the present invention.

Referring to FIG. 1, the mobile node according to an exemplary embodiment of the present invention typically includes a storage unit 110, a radio frequency (RF) unit 120, and a control unit 130.

The storage unit 110 typically includes a program memory and a data memory, but it should be understood that such memories may be portions or allocations of a single memory. The program memory stores application programs for executing general operations of the mobile terminal 100. The data memory stores applications data generated while the application programs are operating. In this exemplary embodiment, the storage unit 110 stores a potential table 115 containing potential information regarding routing.

More particularly, the potential table 115 stores its potentials (potential values) regarding the mobile nodes, i.e. destination nodes, constituting the ad-hoc network. A detailed explanation of potentials is discussed subsequently during the discussion of the potential configuration module.

Meanwhile, the potential table 115 may also include information contained in a conventional routing table such as an identification of neighbor nodes. Also, the routing table can be used for the same purpose by adding a field associated with the potential without having an additional potential table.

In this exemplary embodiment, the storage unit 110 stores potential tables (not shown) of the neighbor nodes together with its own potential table. That is, each mobile node acquires the neighbor nodes' potential tables from the signals transmitted by the neighbor nodes periodically or non-periodically and updates the previously stored potential tables of the neighbor nodes in its own potential table.

The RF unit 120 is responsible for radio communication of the mobile node with another mobile node. The RF unit 120 typically comprises an RF transmitter for up-converting and amplifying a transmission signal and an RF receiver for low-noise amplifying and down-converting a received signal. For example, the RF unit 120 is configured to transfer a route recovery request signal received through a wireless channel to a potential configuration module 140 and converts the information (e.g., route recovery request and updated potential information) output by the potential configuration module 140 to a wireless signal to be transmitted through, for example, a wireless channel.

The control unit 130 controls general operations of the mobile terminal 100. In this exemplary embodiment, the control unit 130 includes the potential configuration module 140 for configuring and updating the potential and a data transmission module 150 for transmitting data to other nodes on the basis of the potential.

The potential configuration module 140 maintains a potential value (or regarding) each individual node including the mobile terminal 100 itself as a destination node. In this embodiment, the potential information comprises the information regarding the location of the mobile terminal 100 on the routes in assumption that each node comprises a destination node. In this exemplary embodiment, a routing path to a destination node is determined on the basis of the potential. The potential is will be described in more detail hereinafter.

Figure 2:
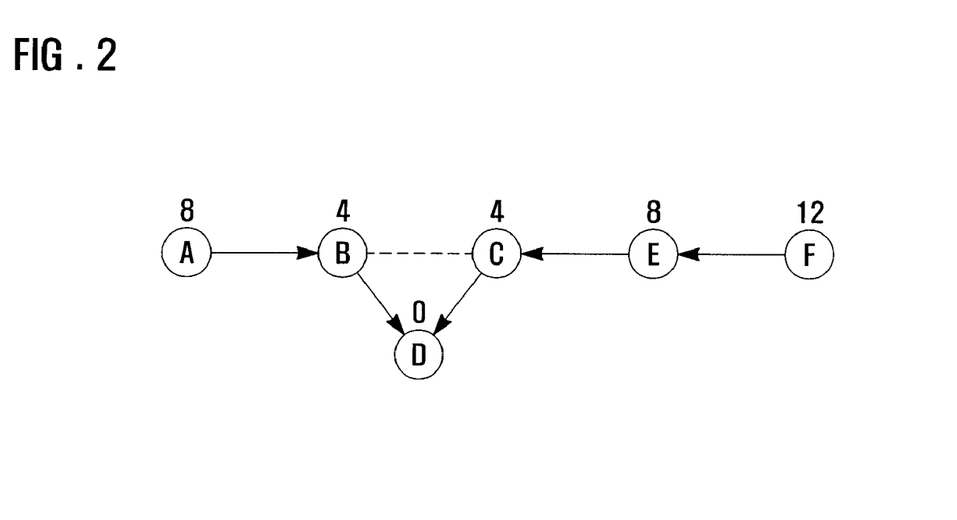
FIG. 2 is a diagram illustrating a routing path for explaining a potential according to an exemplary embodiment of the present invention.

FIG. 2 is a diagram illustrating an example of a routing path for explaining a potential according to an exemplary embodiment of the present invention. Referring to FIG. 2, an ad-hoc network comprises nodes A to F, and each node is presented with a value of its potential to a destination node (node D). The potential value is configured when each node is booted up and connected to the network. Each node configures its potential as a destination node and transmits the potential value to its neighbor nodes. Also, each node receives the potential values transmitted by its neighbor nodes and configures its own potential values to the destination nodes on the basis of the neighbor nodes' potential values. During the configuration procedure, each node configures its own potential values, in its potential table, to every destination node, and stores the potential tables of its neighbor nodes. Accordingly, all the nodes of the network maintain potential values to the other nodes involved in the network.

Although not shown in the drawing, the nodes also heave the potentials to the other nodes. Here, the potential of the node D as the destination node is set to the least value "0."

Although the potential value of the destination node is zero in this embodiment, it is not limited thereto. For example, the potential value of the destination node can be set to a negative value, or another value higher than 0 if it is smaller than any of the potential values of the other mobile nodes.

The neighbor nodes B and C near the destination node D are set with potential value of 4, the nodes A and E are set with potential value of 8, and the node F is set with potential value of 12. That is, in this particular example, the potential value increases by 4 per one hop. In this manner, the initial potentials of the mobile nodes are configured according to a Prime Potential Margin (PPM) at the time when the network is established. The PPM can be set by the network itself or a network operator. In this exemplary embodiment, the PPM is 4 as shown in FIG. 2. Although it is assumed that the ad-hoc network is configured with a PPM of 2 or 4, the value of PPM is not limited thereto. In fact, the PPM could be an arbitrary chosen value, and is not required to be a whole integer (could be 2.5, for example).

After the potential values of all the nodes are set, the routing path is configured such that the potentials decrease in the mobile ad-hoc network. In FIG. 2, a data packet is delivered to the destination node D through the routing paths F-E-C-D and A-B-D.

In this exemplary embodiment, the routing path determined using the potentials set in the above manner. Accordingly, even when the network topology is changed by the mobility of the nodes, the routing path is updated adaptively to the changed network topology using the potential information without requiring a conventional routing table. This potential-based routing method is advantageous for determining and checking a routing path with relatively small amount of information.

Still referring to FIGS. 1 and 2, the potential configuration module 140 of a current node checks the potentials of adjacent nodes and, if all the adjacent nodes have potential values greater than its own potential value, the node broadcasts a route recovery request signal. Such a situation, in which all the adjacent nodes have potential values greater than the current node's potential value is indicative that the routing path to the destination node has been broken. That is, the routing path has been broken by the mobility or failure of at least one of the nodes on the routing path to the destination node (one of the nodes has moved, typically but not necessarily out of range). In such a case, the potential configuration module 140 broadcasts a route recovery request signal to the adjacent nodes for reestablishing the routing path.

The route recovery request signal is propagated only to the node which firstly transmitted the route recovery request signal (referred to hereinafter as the request node or node R) and the adjacent nodes. The route recovery request signal contains potential value information of the request node, a hop count accumulated whenever the signal is relayed by node, and propagation range restricting the propagation of the route recovery request signal. For example, in a case that the node C transmits a route recovery request signal, the route recovery signal received by the node B includes the potential value "4" of the node C, a hop count set to 1, and a propagation range set to 1 (initial propagation range is 1 hop).

Moreover, if a route recovery request signal is received, the potential configuration module 140 checks whether there is a node (node N) of which a potential value is less than that of the node R among its neighbor nodes and current node. If node N exists, the potential configuration module 140 changes the potential of the current node to initiate route recovery for node R according to the propagation range indicated by the route recovery request signal.

In contrast to the aforementioned paragraph, if no node N exists, the potential configuration module 140 rebroadcasts the route recovery request signal such that another node can initiate route recovery. Here, the potential configuration module 140 resets the potential of current node to a value between those of the node N and node R.

In the case where no route recovery response signal is received in response to a predetermined number of retransmissions of the route recovery request signal, the potential configuration module 140 broadcasts a reset request signal for resetting the potential information on the destination node in the entire network. In this case, the network locates the destination node and sets the potential of the destination node such that the destination node's potential is propagated over the entire network from its neighbor nodes in stepwise manner. Accordingly, the potential value of the destination node is updated at all nodes of the network.

Before relaying the route recovery request signal, the potential configuration module 140 determines whether the potential value margin between the current node and the neighbor node of which the potential value is the least among the neighbor nodes is greater than the PPM. If the potential value margin is greater than the PPM, the potential configuration module 140 increases the current node's potential value to regulate the potential value margin between the two nodes.

In the case where the mobile terminal 100 comprises the destination node, the potential configuration module 140 maintains the current node's potential value to be less than the neighbor nodes' potential values. When the potential value margin between the current node and the neighbor node of which potential is the least among the neighbor nodes is less than the PPM, the potential configuration module 140 decreases the current node's potential to regulate, i.e. widen, the potential margin between the two nodes.

Also, when the potential value margin between the current node and the neighbor node of which potential value is the least among the neighbor nodes is greater than the PPM, the potential configuration module 140 increase the current node's potential value so as to narrow the potential margin.

When a data transmission request is received, the transmission module 150 compares the current node's potential value and its neighbor nodes' potential values. If there is a neighbor node having a potential value that is less than the current node's potential value, the transmission module 150 transmits the received data to the neighbor node.

Now an exemplary routing method for the above structured mobile ad-hoc network according to the present invention is described hereinafter. The structures and functions of the mobile terminal as a mobile node constituting the mobile ad-hoc network will be more clearly understood by the following descriptions.

Figure 3:
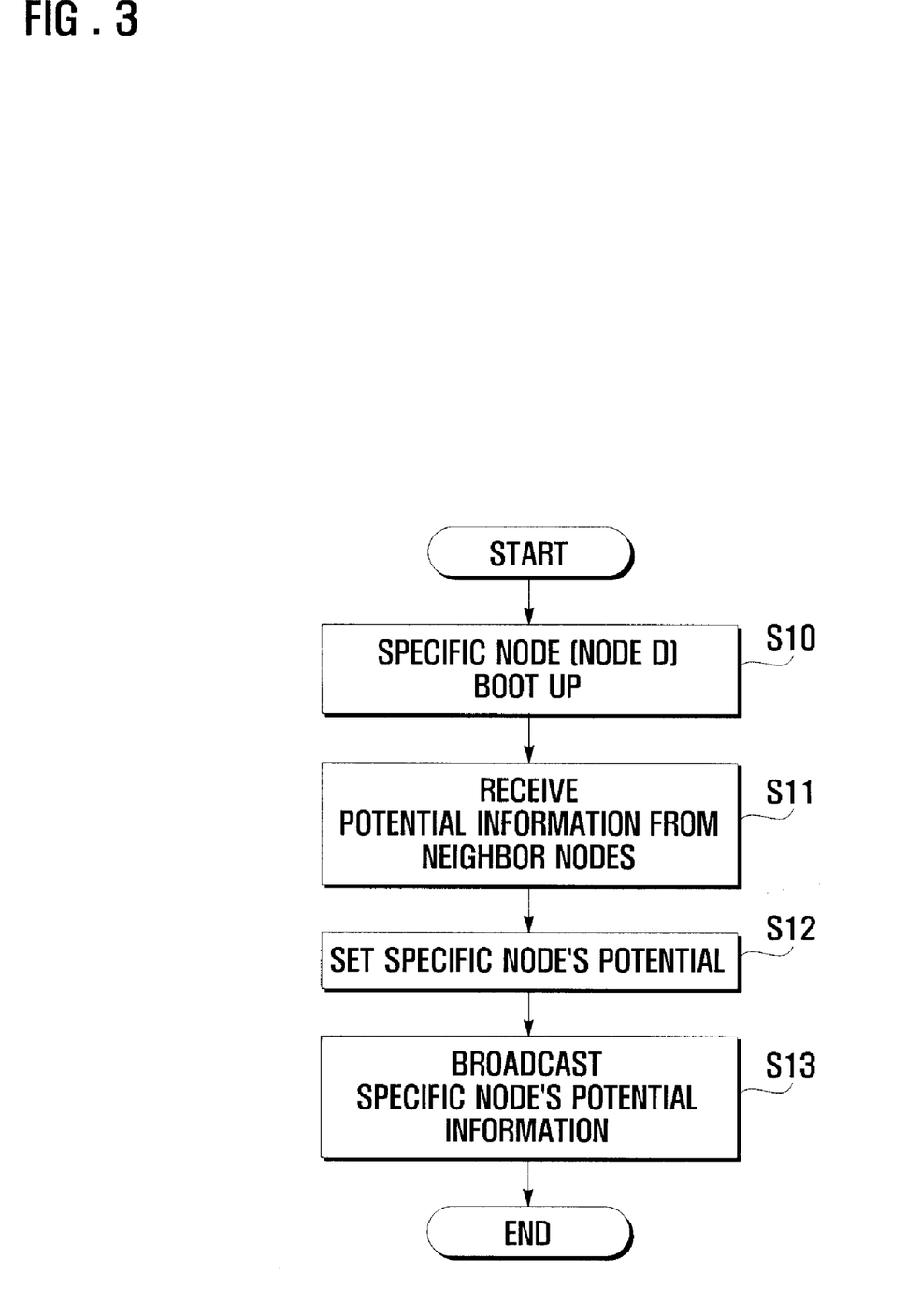
FIG. 3 is a flowchart illustrating an initial potential configuration procedure of a routing method for a mobile ad-hoc network according to an exemplary embodiment of the present invention.

FIG. 3 is a flowchart illustrating an example of the initial potential value configuration procedure of a routing method for a mobile ad-hoc network according to an exemplary embodiment of the present invention.

Still referring to FIG. 3, the potential value configuration procedure of the mobile ad-hoc network according to this particular exemplary embodiment of the present invention starts with the boot-up of a specific node (node D in this embodiment) (S10). If the node D boots up, it broadcasts a signal for advertising its entry to the network such that other nodes recognize the entry of the node D.

Upon receiving the entry advertisement signal, the adjacent nodes transmit potential information of the node D, i.e. a potential table, to the node (S11). The potential table includes potential values of the adjacent nodes.

If the potential tables are received from the adjacent nodes, the node D stores the potential table and generates its own potential table 115 on the basis of the adjacent nodes' potential tables (S12). At this time, the node D sets its potential values to the respective nodes. More specifically, with regard to step S12, if the node D is booted up in step 10, in FIG. 2, it acquires the potential information from the nodes B and C. Although not shown, it is assumed that the potential value information received from the node C includes the node C's potential value, which is set to 4, to the node E. In this case, the node D sets its potential to the node E to 8 by adding the PPM value "4" to the node C's potential value "4". The node D also sets its own destination potential. In this example, the node D's potential value is set to "0". However, the destination potential is not limited to 0.

After setting the potential values to all the nodes in the network in the above manner, the node D broadcasts its potential table 115 to the adjacent nodes (S13).

Each node which receives the potential table from the node D adds or updates its own potential value to the node D on the basis of the potential table. For example, the node C sets its potential value to the node D to 4 on the basis of the potential value information transmitted by the node D by adding the PPM to the node D's potential value of "0".

Next, the node C transmits its updated potential value information to the neighbor nodes (in FIG. 2, node E). Such a potential value information update process is sequentially carried out from the destination node to the other nodes in the entire network such that all the nodes set their potential values indicating the routing paths to the node D. In this manner, when a new node enters the network, the potential values to the new node are set at the other nodes over the entire network and the new node acquires information on all the potential values of destination nodes. When a new mobile ad-hoc network is configured, each node of the network sets appropriate routing paths (potentials) to all potential destination nodes according to the above exemplary procedure.

Figure 4A:
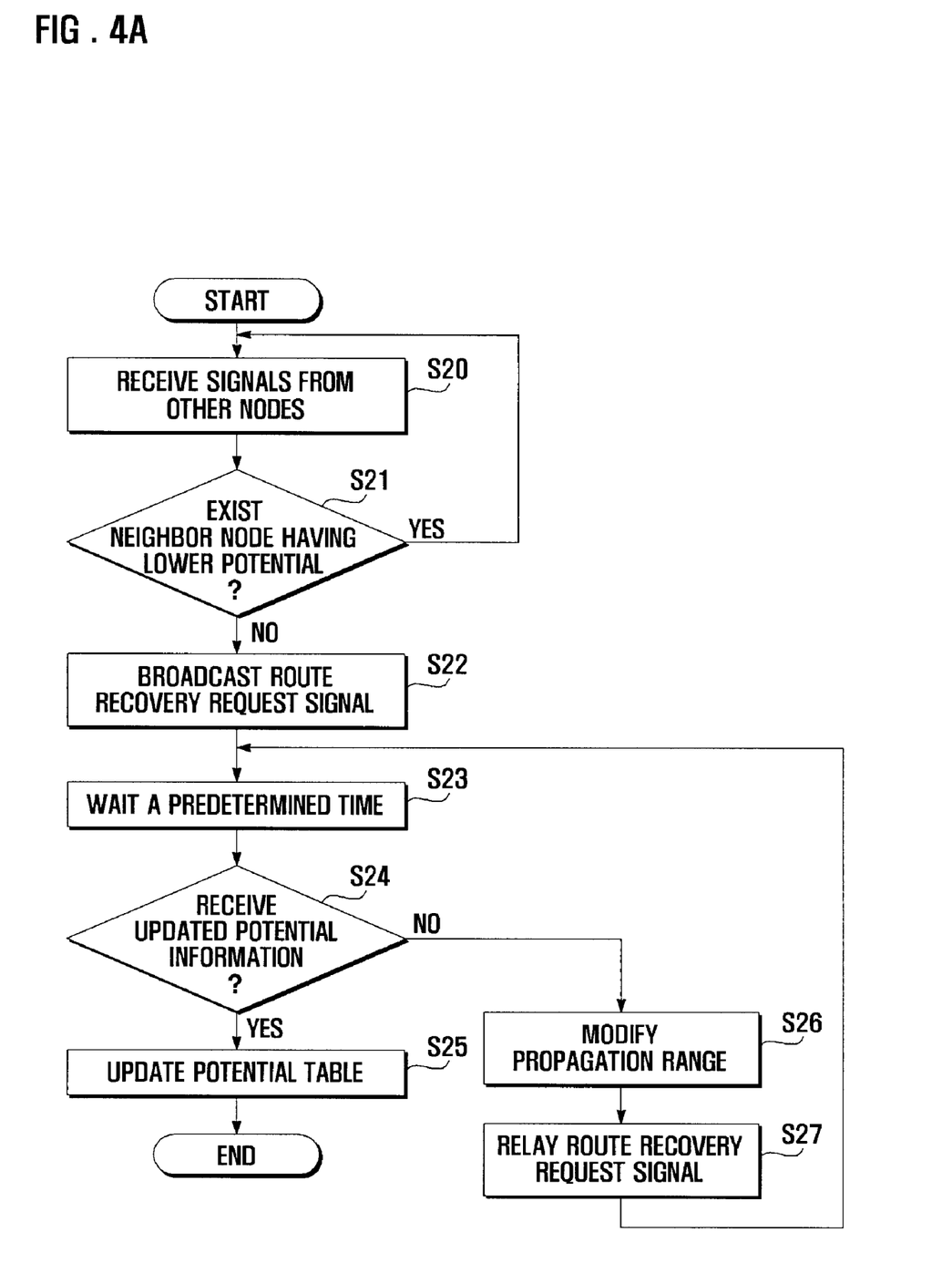
FIG. 4A is a flowchart illustrating a route recovery procedure of a routing method at a route recovery request node according to an exemplary embodiment of the present invention.
Figure 4B:
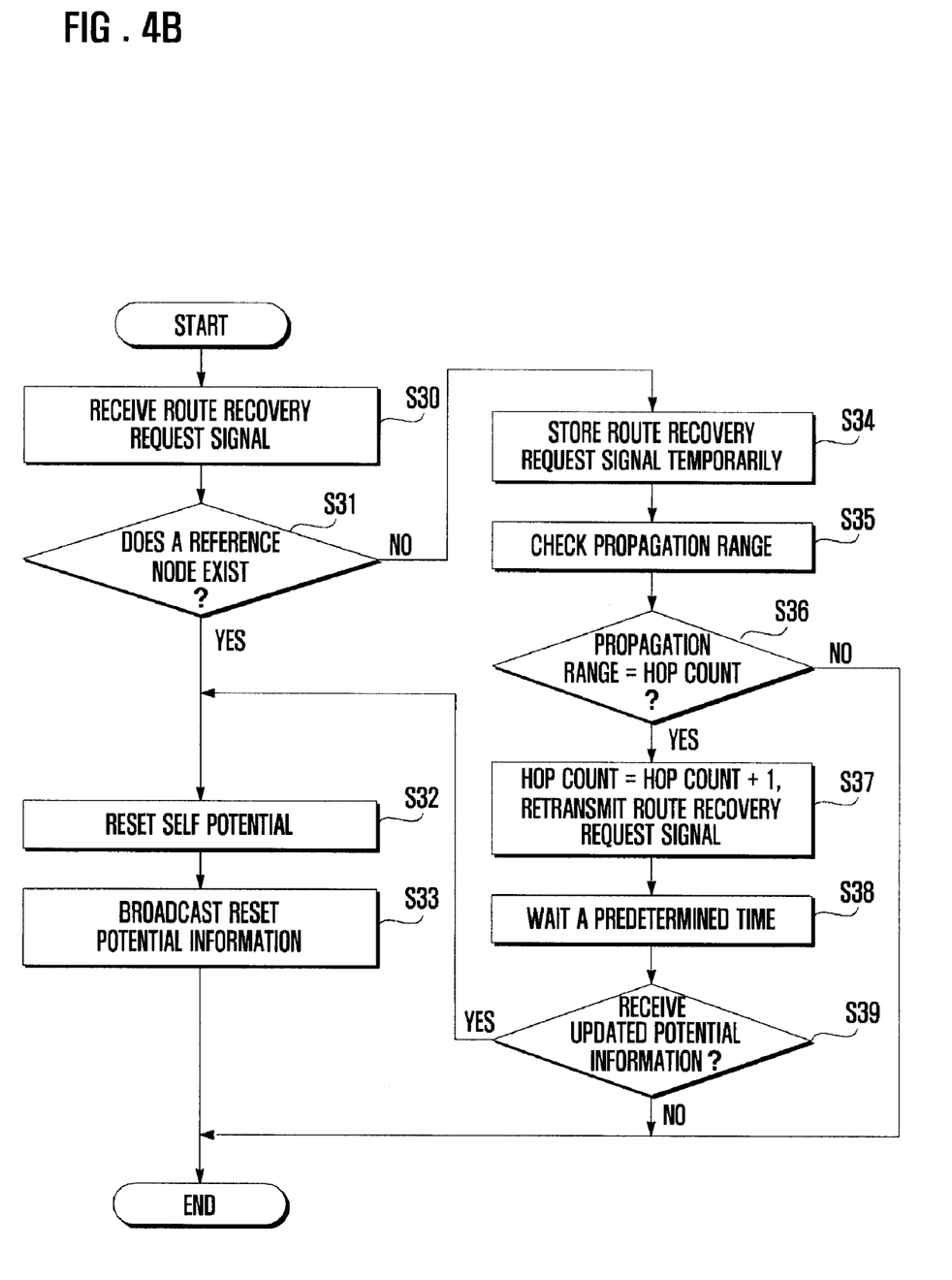
FIG. 4B is a flowchart illustrating a route recovery procedure of a routing method at a route recovery response node according to an exemplary embodiment of the present invention.
Figure 5:
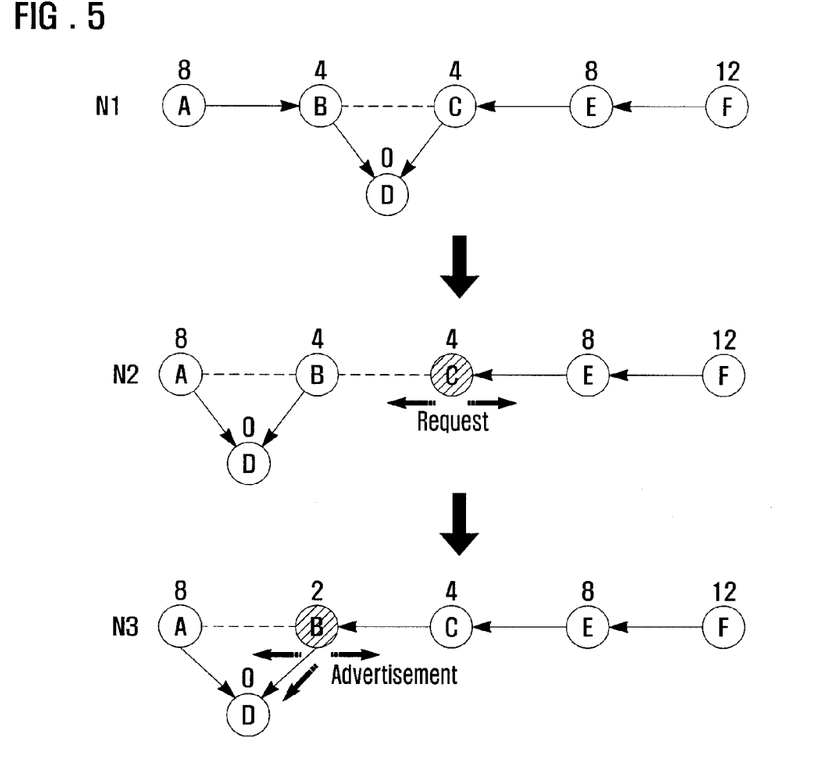
FIG. 5 is a diagram illustrating steps of route recovery procedure of a routing method according to an exemplary embodiment of the present invention.

FIG. 4A is a flowchart illustrating an example of a route recovery procedure of a routing method at a route recovery request node according to an exemplary embodiment of the present invention, and FIG. 4B is a flowchart illustrating an example of a route recovery procedure of a routing method at a route recovery response node according to an exemplary embodiment of the present invention. FIG. 5 is a diagram illustrating exemplary steps of the route recovery procedure of a routing method according to another exemplary embodiment of the present invention.

Referring to FIGS. 1 to 5, and particularly now to FIG. 4A, the route recovery procedure at the route recovery request node in the mobile ad-hoc network according to an exemplary embodiment of the present invention starts with a reception of signals periodically transmitted by neighbor nodes (S20).

Each node receives the periodic signals from its neighbor nodes. When the periodic signal is received, the node determines whether there is a neighbor node of which a potential value to the destination node is less that its potential value (S21).

If there is a neighbor node having a potential value which is less than the current node, the node maintains the idle state to receive the signals from its neighbor nodes (S20).

In order to simplify the explanation, the route recovery procedure is described with an exemplary network having a topology N1 as shown in FIG. 5. However, the network topology is not limited there to.

Referring to N1 of FIG. 5, all nodes have their potential values shown to a destination node, i.e. node D, each node except for the destination is connected to a neighbor node of which the potential value is less than its own potential value.

If a node moves in the network topology N1, i.e. the node D moves such that the network topology is changed as N2, the node C recognizes that there is no neighbor node of which the potential value is less than its own potential on the basis of the signal received from its neighbor nodes.

In such case as in N2, where all the neighbor nodes' potential values are greater than its own potential value, the node C broadcasts a route recovery request signal (S22). The route recovery request signal transmitted by the node C includes its potential value set to 4, an initial hop count set to 1, and a propagation range (a number of hops) set to 1. The route recovery request signal is received by the neighbor nodes B and E.

After transmitting the route recovery request signal, the node C waits updated potential information on the destination node from the neighbor nodes in a predetermined period (S23).

In the meantime, the route recovery request signal broadcasted at step S22 are received by the neighbor nodes at step S30 of FIG. 4B. Each neighbor node received the route recovery request signal starts the route recovery procedure as shown in FIG. 4B.

Referring to FIG. 4B, the neighbor nodes of the node C receives the route recovery request signal (S30).

Each of the neighbor nodes (i.e., node B and node E) checks whether any of its adjacent nodes has a potential value less than the node C's potential value (S31).

Referring to the network topology N3 of FIG. 5, the node E checks its neighbor node F's potential at step S31 to determine whether a reference node exists. A reference node is a node having a lower potential value than a current node. The node F's potential value is 12 which is greater than the node C's potential of 4. In this case, the node E stores the route recovery request signal in the storage unit 110 temporarily (S34). The reason why the node E stores the route recovery request signal is to update its potential when the updated potential information is received from its adjacent nodes afterward.

After temporarily storing the route recovery request signal, the node E checks the propagation range indicated in the rout recovery request signal (S35) and determines whether the hop count and the propagation ranges are identical with each other (S36).

In this exemplary embodiment, the propagation range is set to 1. This range indicates that the route recovery request signal is transmitted to nodes distant by 1 hop from the route recovery request node, i.e. node C. Accordingly, the node E does not relay the route recovery request signal to other nodes. However, if it is determined that the propagation range is set to a value (2 or 4) greater than the hop count at step S36, the node E relays the route recovery request signal to its neighbor nodes (S37). At this time, the node E increases the hop count of the route recovery request signal by 1 such that the nodes (i.e., node F) received the route recovery request signal from the node E recognizes that they are distant by 2 hops from the route recovery request node (node C).

In the meantime, the node B recognizes that a neighbor node (i.e., node D) has a potential set to 0 less than the node C's potential at step S31, as shown in the network topologies N2 and N3. Accordingly, the node B updates its potential value to the node D (S32). At this time, the node B sets its potential to a value (in this exemplary embodiment, 2) between the potential values of the node C and node D. The potential value is set according to equations (1) and (2):

$$P = P_N + dP \quad (1)$$

$$dP = (P_R - P_N)/(H_R + 1) \quad (2)$$

where P denotes potential, $P_N$ denotes the potential of a neighbor node (node D in N2 of FIG. 5) which is less than that of the route recovery request node (node C), and dP denotes a potential displacement. Also, $P_R$ denotes a potential of the route recovery request node (node C), $H_R$ denotes a hop count from a node R to the current node. Accordingly, the potential of node B is calculated as following:

$$dP = (4-0)/(1+1) = 2$$

$$P = 0 + 2 = 2.$$

After updating the potential, the node (node B) broadcasts its potential information to its neighbor nodes (S33).

Accordingly, the neighbor nodes of the node B recognize that the node B's potential value to the node D.

At this time, since the node D is the destination node, it ignores the change of the node B's potential value. In the case of node A, it detects that, among the neighbor nodes, the node D has a potential less than the node B's potential such that the node A maintain its current potential value.

In the meantime, referring to FIG. 4A, the node C receives a signal advertising the change of the node B's potential from the node B (S24). Upon receiving the advertisement signal from the node B, the node C updates its potential table (S25). As a result, the node C has a neighbor node of which potential is less than node C' potential to the node D. Accordingly, the routing path from the node C to the node D is recovered.

Until now, how the routing path is recovered by the node distant by 1 hop from the route recovery request node has been described. An example of one way to recover a routing path by a node distant by 2 hops from the route recovery request node according to the present invention is described hereinafter.

Figure 6:
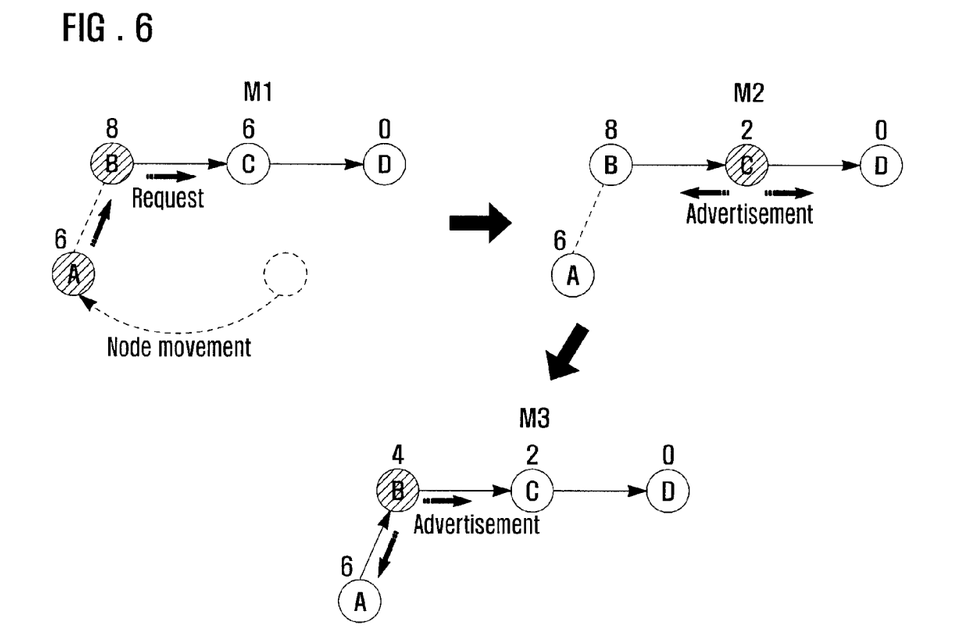
FIG. 6 is a diagram illustrating steps of route recovery procedure of a routing method according to another exemplary embodiment of the present invention.

FIG. 6 is a diagram illustrating an example of steps of a route recovery procedure of a routing method according to another exemplary embodiment of the present invention.

Referring to FIGS. 1 to 4B and 6, a route recovery procedure is described in an exemplary case in that the node A having a potential set to 6 moves to near the node B having a potential set to 8 in association with the node D as its destination node.

In this exemplary embodiment, the nodes B and C of FIG. 6 perform the route recovery procedure depicted in FIG. 4B. Accordingly, the route recovery procedures of the nodes B and C are described with reference to FIG. 4B. Although the same reference numerals are used with the operations of different nodes, the nodes carry out the route recovery procedure independently.

In a network topology M1 of FIG. 6, the node A receives only the signals transmitted by the node B (S20). Accordingly, the node A recognizes that there is no neighbor node of which potential is less than its own potential to the node D (S21).

Since there is no candidate neighbor node for establishing a routing path to the destination node D, the node A broadcasts a route recovery request signal containing its potential "6" set for the node D, the initial hop count set to 1, and the propagation range set to 1 (hop) (S22).

As a result, the node B distant by one hop from the node A receives the route recovery request signal (S30).

If the route recovery request signal is received, the node B checks whether any of its neighbor nodes' potential values is less than the potential value of node A as the route recovery request node (S31). In FIG. 6, the node B has only one neighbor, node C, except for the route recovery request node, and the node C's potential "6" is equal to the route recovery request node C. Since there is no neighbor node of which potential is less than that of the route recovery request node A, the node B performs steps S34 to S36 of FIGS. 4B and 5 to update its potential.

In the meantime, the node A waits a route recovery response signal in a predetermined period at step S23. If no route recovery response signal is received in the period at step S24, the node A increases the value of the propagation range of the route recovery request signal (S26) and retransmits the route recovery request signal (S27). That is, the value of the propagation range is increased by 1 so as to be set to 2. In this example, whenever the route recovery request signal is retransmitted, the propagation range is increased by 1 hop. It is within the spirit and scope of the present invention that there could be, for example, one retransmission at the same propagation range prior to changing the propagation range. If it is failed receiving the route recovery response signal in a predetermined number of retransmissions (e.g., 4 times), the node A broadcasts a reset request signal to all nodes of the network for resetting their potentials to the destination node. The reset request signal is propagated over the network such that all the nodes of the network reset their potentials to the destination node D. The potential reset procedure is carried out in a similar manner with the initial potential configuration procedure. That is, the node D resets its potential firstly set, and each neighbor node resets its potential by adding the value of PPM to the potential value of the node D. This potential reset process is performed by all the nodes in a sequential manner.

If the route recovery request signal is retransmitted with the propagation range set to 2 by the node A, the node B recognizes that the propagation range of the route recovery request signal is 2 through steps S30 to S35. Since the propagation range value "2" is greater than the hop count value "1", the node B increases the hop count by 1 and relays the route recovery request signal to its neighbor nodes (S37). In this particular case, the node C starts its route recovery procedure by receiving the route recovery request signal from the node B at step S30. Upon receiving the route recovery request signal, the node C compares the potentials of its neighbor nodes and the route recovery request node A's potential (S31). Among the neighbor nodes B and D, the node D has the potential less than the node A's potential such that the node C resets its potential (S32) using equations (1) and (2) as following:

$$dP = (6-0)/(2+1) = 2,$$

$$P = 0 + 2 = 2.$$

Here, the hop count $H_R$ is 2 at the node B, such that the node C's potential P to the node D becomes 2 according to equation (1).

After resetting its potential value, the node C broadcasts an advertisement signal indicating its new potential value, as shown in the topology M2 of FIG. 6 (S33).

If the node C broadcast the potential information advertisement signal, the node B receives the advertisement signal (S39) and enters updates its potential value to the node D (S32). At this time, the node B uses the route recovery request signal stored temporarily at step S34. The potential value of node B is calculated using equations (1) and (2) as following:

$$dP = (6-2)/(1+1) = 2$$

$$P = 2 + 2 = 4$$

Among the neighbor nodes of node B, the node C has a potential value less than the node A's potential value. Accordingly, the $P_N$ of equation (1) is placed by 2, resulting in 4 of the node B's potential value.

After resetting its potential value, the node B broadcasts a potential information advertisement signal (S33) and the neighbor nodes A and C receives the advertisement signal (S24).

If the potential information advertisement signal is received from the node B, the node A recognizes that the node B's potential value is less than its potential and update its potential table (S25).

In this manner, the routing path from the node A to node D is successfully recovered.

If a data packet is transmitted by a node on the new routing path, each node performs relay of the data by means of the data transmission module 150 such that the data packet is received by the node D. Here, the data transmission unit 150 transmits the data packet to a neighbor of which potential is less than the current node's potential value. This potential-based packet relay is repeated until the packet reaches the destination node.

As described above, in the routing method of the present invention, the nodes of the mobile ad-hoc network exchange only the potential information for recovering the routing path broken by the change of network topology. Furthermore, the route recovery request signal is relayed only to the nodes of which the potential value is less than the current node's potential value. Accordingly, the routing method of the present invention is advantageous in reduction of traffic redundancy and short propagation range of control signals in comparison with the conventional routing methods in which relatively large routing tables are transmitted over the entire network, resulting in an improvement of the network throughput.

In the meantime, the decreases of the potential value margins among the mobile nodes may cause problems in the mobile ad-hoc network. In order to prevent such problems from occurring, each node adjusts its potential margins with other nodes by itself. How a mobile node adjusts its potential margin with other nodes is described hereinafter.

Figure 7A:
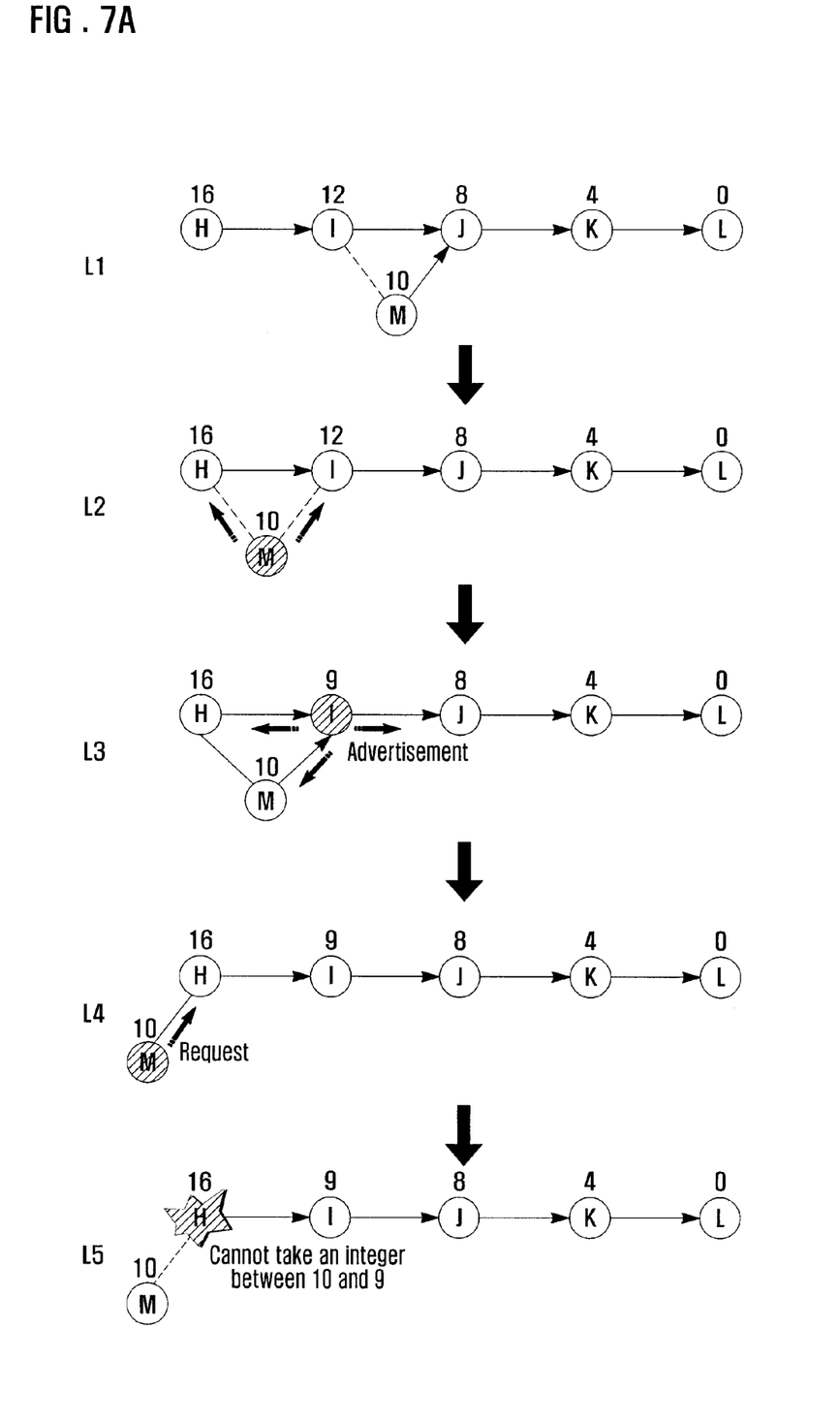
FIG. 7A is a diagram illustrating how a potential margin problem occurs in a mobile ad-hoc network.
Figure 7B:
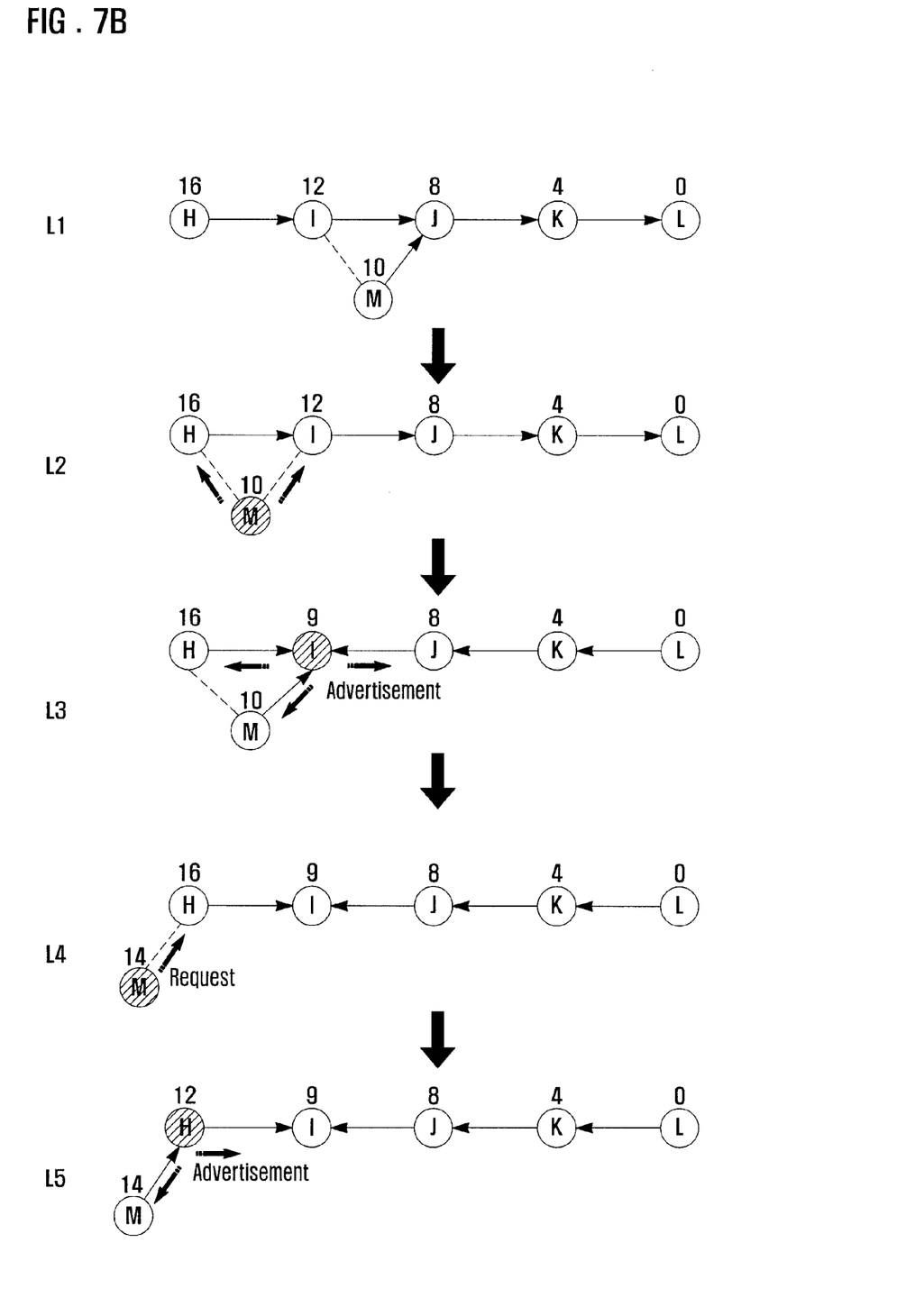
FIG. 7B is a diagram illustrating steps of a potential margin adjustment procedure in a routing system according to an exemplary embodiment of the present invention.

FIGS. 7A and 7B are diagrams illustrating steps of self-potential adjustment procedure of a mobile node in a mobile ad-hoc network according to an exemplary embodiment of the present invention.

FIG. 7A is a diagram illustrating how a potential margin problem occurs in a mobile ad-hoc network, and FIG. 7B is a diagram illustrating steps of a potential margin adjustment procedure in a routing system according to an exemplary embodiment of the present invention.

Referring to FIG. 7A and L1 and L2, the node M moves to be associated with the node H and I (after previously being associated with the node I and J) such that the network is changed in topology from L1 to L2. Since the potentials of the nodes H and I are greater than the node M's potential, the node M broadcasts a route recovery request signal such that the node I's potential is reset to 9 through the above-described route recovery procedure as shown in the topology L3 of FIG. 7A.

In this situation, if the node M moves to be associated with only the node H as shown in the topology L4 of FIG. 7A, the node M broadcasts a route recovery request signal again such that the node H tries to reset its potential to a value between the potentials of the node M and node I. However, there is no intermediate value between the node M's potential 10 and the node I's potential 9. This situation is likely to occur, when the nodes move quickly without potential reset process, and causes routing errors. In order to solve this problem, the route recovery request node adjusts the potential margins with the adjacent nodes before broadcasting the route recovery request signal in this embodiment.

Referring to FIG. 7B, if the node M of which potential is 10 recognizes that there is a need to reset its potential, it compares the least one among the neighbor nodes' potential values with its own potential value. If the potential margin between the two nodes is greater than the PPM, the route recovery request node M increases its potential close to the neighbor node's potential.

In the case of topology L4, the node M resets its potential to a value "14" close to the node H's potential "16". Preferably, the potential value is determined such that the potential margin between the two nodes is less than the PPM. In this exemplary embodiment, it is assumed that the PPM is 4. Accordingly, the potential value of the node M is reset to a value making the potential margin between the nodes M and H less than 4. In the topology L4 of FIG. 7B, the node M's potential is reset to 14 such that the potential margin between the nodes M and H is 2. In this particular case, the potential margin between the nodes M and I are broad enough to fine an intermediate value such that the node H can reset its potential to an appropriate value (12 in topology L5).

As described above, since the route recovery request node adjusts its potential value before broadcasting the route recovery request signal, it is possible to avoid the a route recovery failure caused by the condensed potential values.

In the case that the least potential value margin between the destination node and the respective neighbor nodes of the current node decreases to be less than the PPM, the destination node decreases its potential value as much as a predetermined value for preventing the route recovery failure from occurring by the decrement of the potential value margins between the destination node and the neighbor nodes.

The self-potential adjustment mechanism of the destination node is described hereinafter with reference to FIGS. 8A and 8B.

Figure 8A:
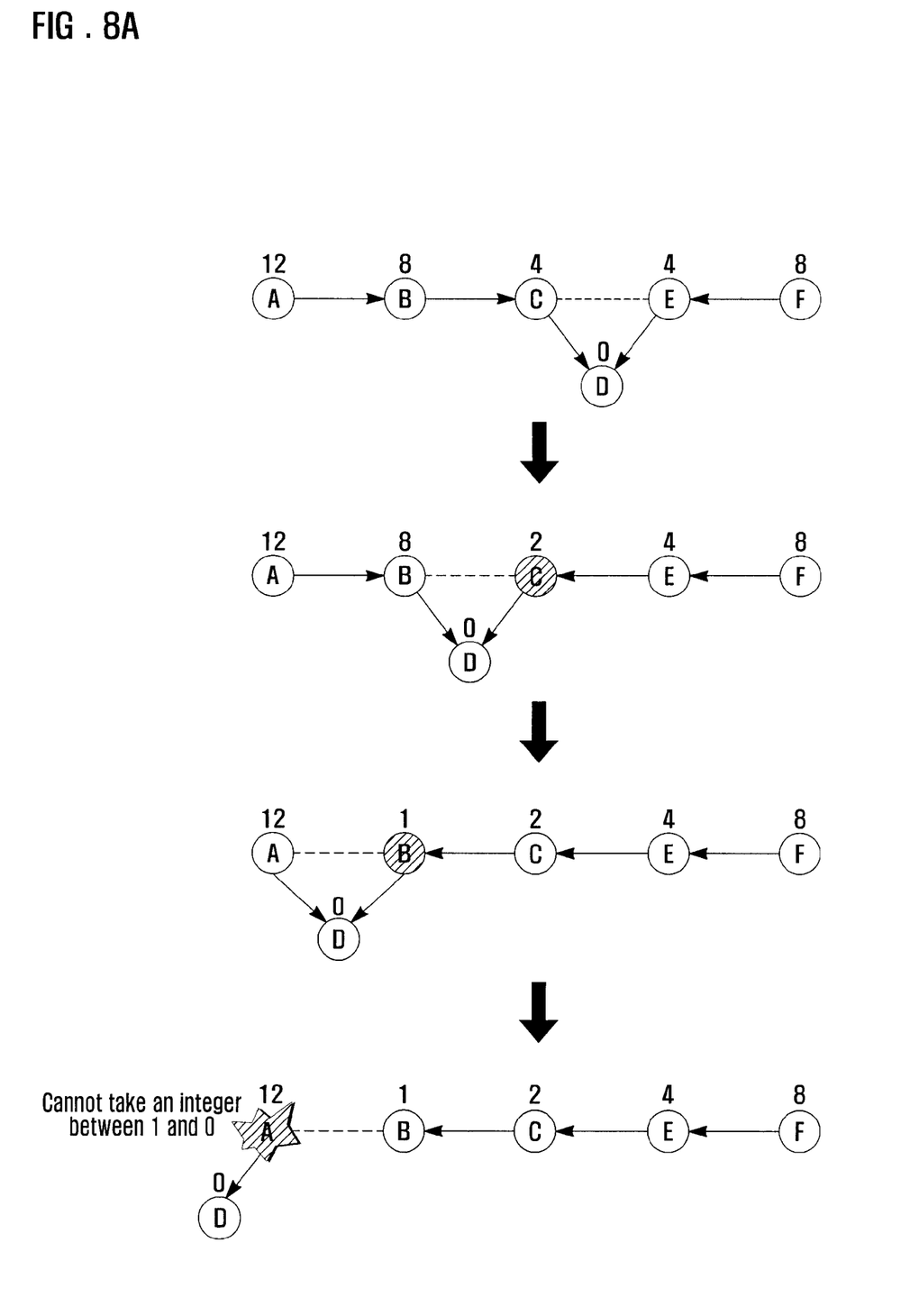
FIGS. 8A and 8B are diagrams illustrating steps of a self-potential adjustment procedure of a routing method according to an exemplary embodiment of the present invention.
Figure 8B:
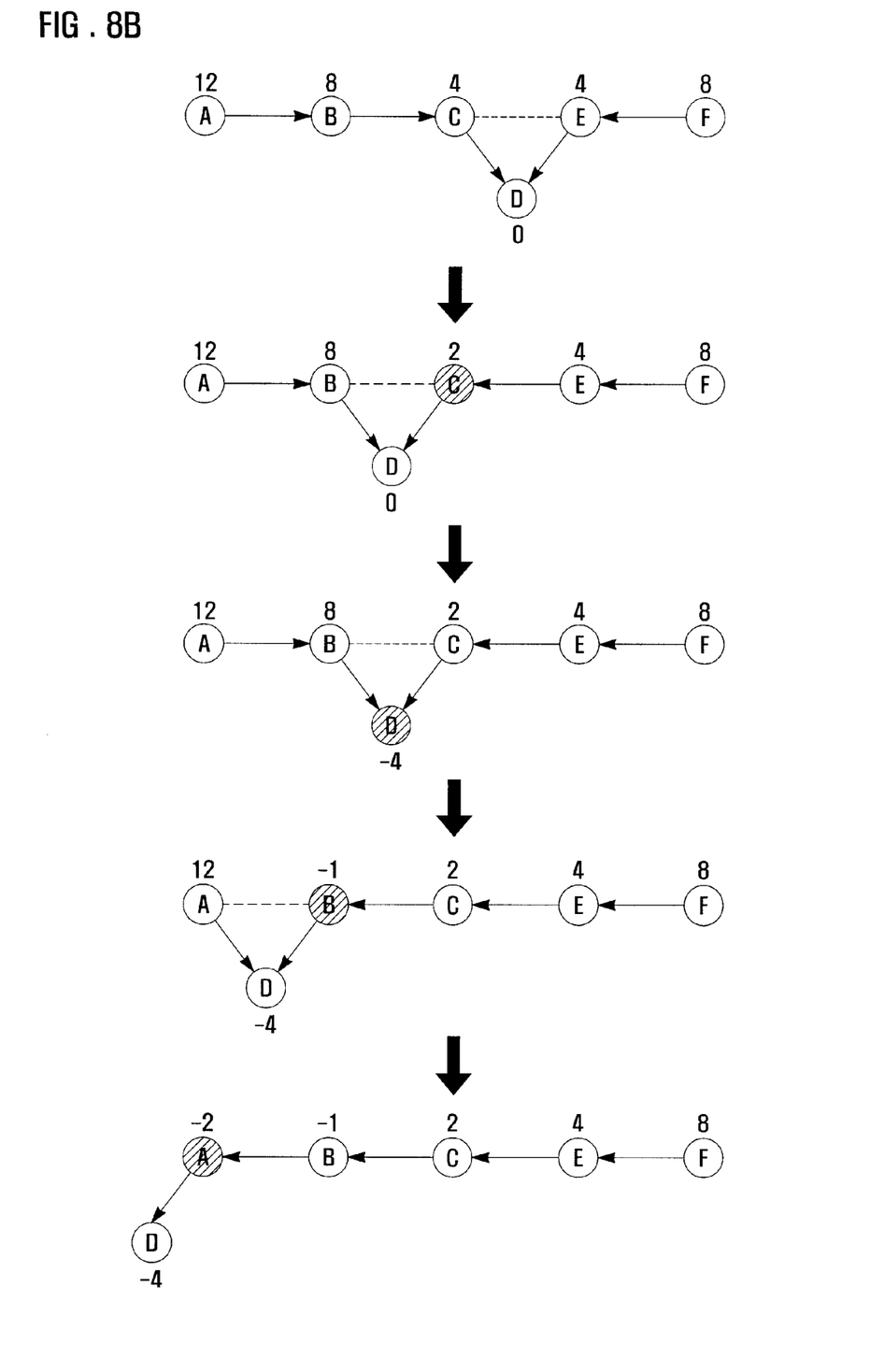

FIGS. 8A and 8B are diagrams illustrating steps of a self-potential adjustment mechanism of a routing method according to an exemplary embodiment of the present invention.

Referring to FIG. 8A, in a case where the destination node D moves in a direction while maintaining its potential, a potential margin between the nodes adjacent to the destination node D may decrease so as to cause a route recovery failure. In an exemplary embodiment of the present invention, if the node C's potential decreases by the movement of the destination node D, i.e. the potential value margin between the nodes C and D to be less than PPM, the destination node D decreases its potential value so as to be set to −2 as shown in FIG. 8B. That is, the node D's potential is reset such that the potential margin between the nodes C and D becomes greater than the PPM. Accordingly, such a process is carried out repeatedly whenever the destination node D moves to be associated with another node. Consequently, the node A's potential is easily set to an intermediate value between the node D's potential value and the node B's potential value. In another case that the potential margin between the current node's potential and the least potential among its neighbor nodes' potential values is greater than the PPM, the current node decreases its potential value so as to recover an optimal routing path. The routing path optimization procedure is described hereinafter with reference to FIGS. 9A to 9C.

Figure 9A:
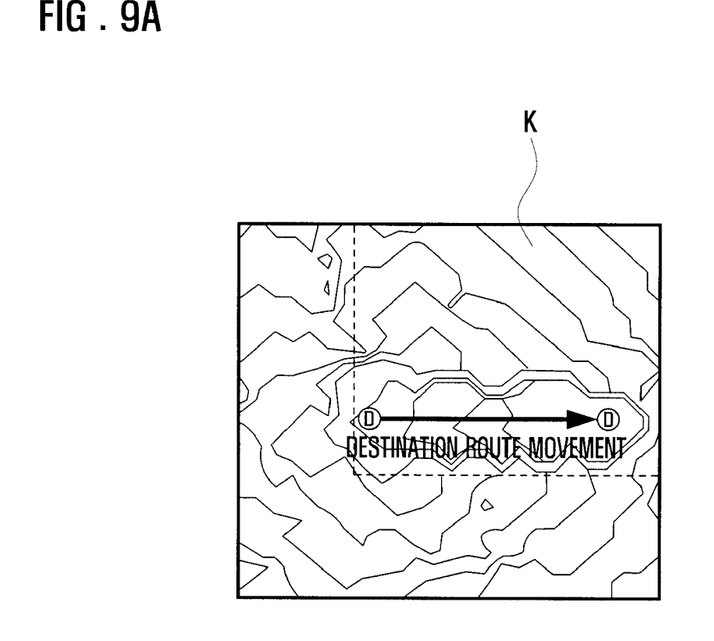
FIGS. 9A to 9C are diagrams illustrating steps of routing path optimization procedure of a routing method according to an exemplary embodiment of the present invention.
Figure 9B:
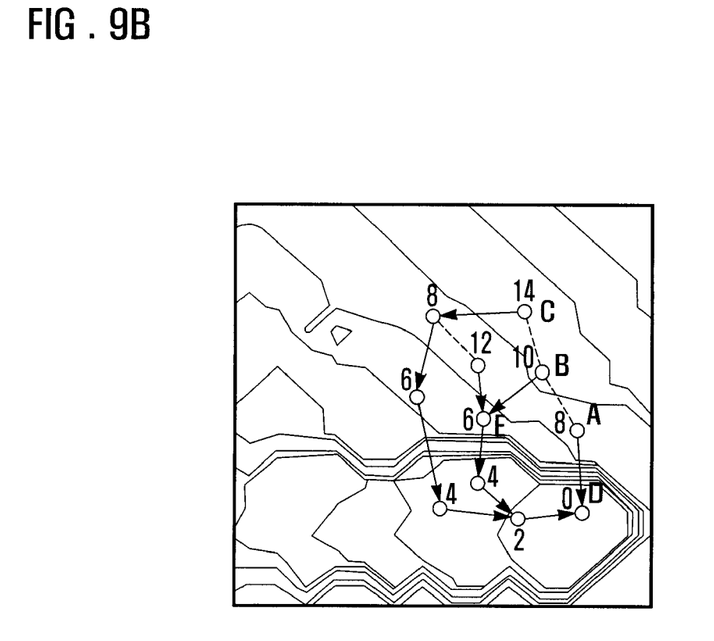
Figure 9C:
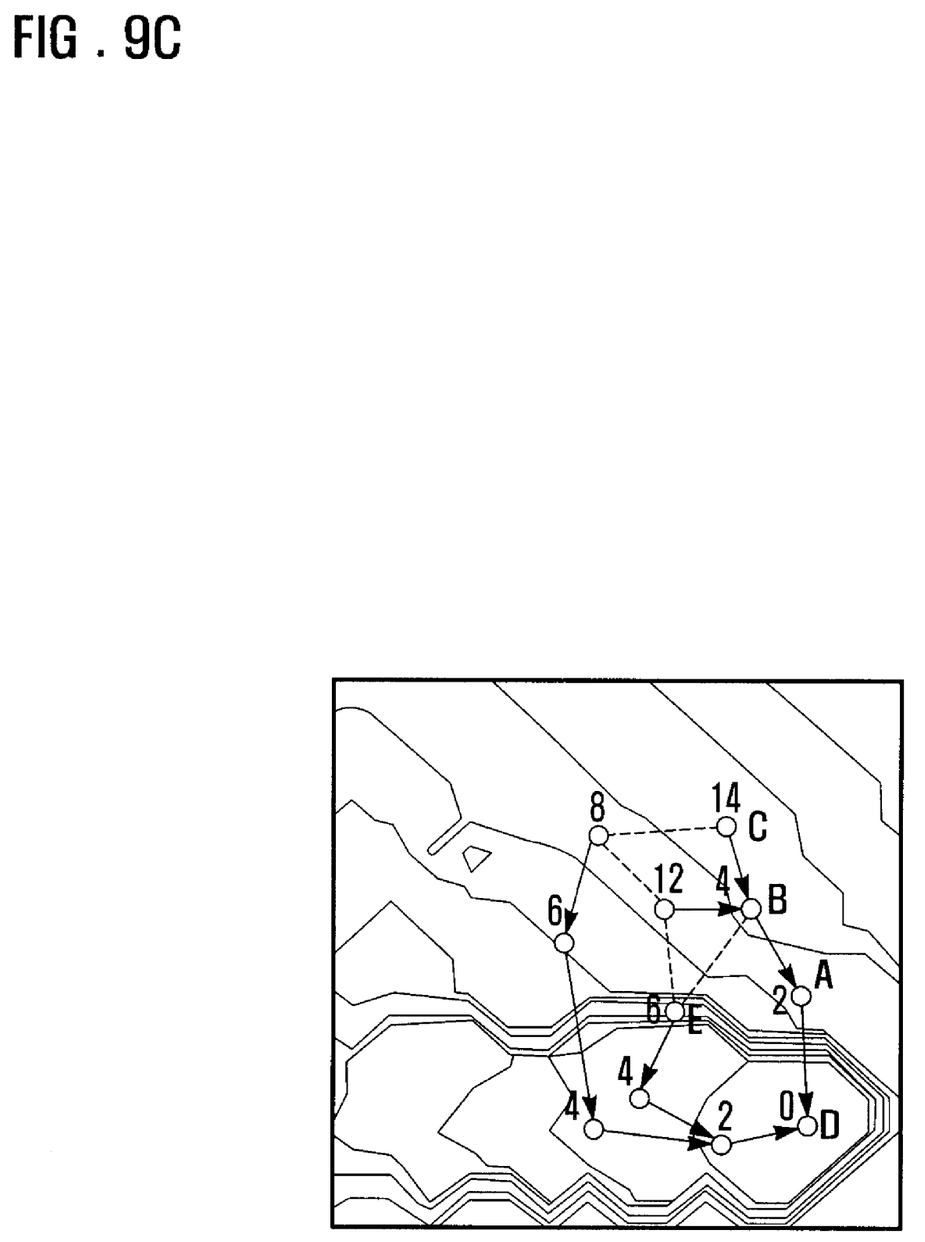

FIGS. 9A to 9C are diagrams illustrating steps of routing path optimization procedure of a routing method according to an exemplary embodiment of the present invention.

FIG. 9A shows a mobility of a destination node in a mobile ad-hoc network. In FIG. 9A, the destination node moves in a direction of an arrow without depiction of other nodes. The distribution of potentials to the destination node is presented in the form of level curves. FIGS. 9B and 9C are enlarged views illustrating an area K of FIG. 9A.

If the destination node moves in the arrow direction, the other nodes around the destination node reset their potential values in association with the position of the destination node. The movement of the destination node may fail to optimize the routing paths of the adjacent nodes to the destination node as shown in FIG. 9B. In FIG. 9B, the nodes A, B, and C provide a shortest routing path to the node D (C-B-A-D). However, since each node transmits a packet according to a least-potential node first rule, the packet is delivered through a relatively distant route (the route established by the solid arrows) rather than the shortest route.

The shortest route establishment failure is caused by the irregular potential distribution. Although the node A locates close to the destination node D, the node A has a potential value of "8" which is so high relative to the node D's potential value of "0". Accordingly, when the node B has a packet to be transmitted to the destination node D, the node B selects the node E having a potential value "6", which is less than the node A's potential value "8" as the next hop node, whereby the packet is delivered to the destination node D through a relatively long routing path in spite of the existence of the shortest route.

In an exemplary embodiment of the present invention, each node adjusts its potential value when its potential value margin with a neighbor node is greater than a predetermined value (e.g., PPM). For example, the node A knows the potential value margin between the node A and node D by comparing its potential with the node D's potential and recognizes that the potential margin is greater than the PPM. In this case, the node A decreases its potential value to 2 less than the PPM as shown in FIG. 9C. Accordingly, the node B selects the node A as the next hop node for establishing the route to the destination node D. Meanwhile, a potential value margin between the node B and node A increases as the node A's potential decreases. In this case, the node B also decreases its potential (4 in FIG. 9C) value. In this manner, an optimal routing path from the source node C to the destination node D is established.

Since the potential value adjustment is propagated from node to node, frequent potential value adjustment increases network traffic. In order to minimize the generation of redundant traffic, the potential value adjustment can be restricted to be performed when the potential value margin between the current node and the neighbor node having the least potential value is greater than PPM+$\alpha$ ($\alpha$>0). Also, each node can be configured to perform the potential value adjustment even when a route recovery request signal is received from another node. Both the two potential value adjustment schemes can be adopted simultaneously.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. For example, in the exemplary embodiments of the present invention, the route recovery request and potential advertisement signals are broadcasted. However, the route recovery request and potential advertisement signals can be transmitted in a multicast or unicast manner.

Also, although the mobile ad-hoc network is composed of the mobile terminals in the exemplary embodiments, the ad-hoc network can implemented with various kinds of portable devices if they support the potential-based routing function.

As described above, the routing method and system for a mobile ad-hoc network according to the present invention is advantageous in reduction of redundant traffic since the mobile nodes of the network exchanges small amount of potential information for recovering routing paths. Also, the routing method and system of the present invention is implemented such that the route recovery request signal is propagated in a predetermined propagation range set in consideration of potentials of adjacent nodes, thereby further reducing redundant traffic in comparison with the conventional routing methods exchanging routing tables. By reducing the redundant traffic, the routing method and system of the present invention improves the entire network throughput. In addition, the packet may be transmitted through a route having a lowest total potential value if there is more than one route having a descending order.

What is claimed is:

1. A routing method for a mobile ad-hoc network including a plurality of mobile nodes, comprising:
(a) setting, at each current node, a self-potential value to a destination node upon receiving a route recovery request; and
(b) transmitting, when a transmission packet is destined to the destination node, the packet through a route established with at least one node in a descending order of potential value;
wherein the self-potential value is set with reference to potential values of neighbor nodes, and wherein setting the self-potential value comprises:
(i) checking the potential values of the neighbor nodes;
(ii) relaying, when all the neighbor nodes' potential values are greater than the self-potential value, the route recovery request to the neighbor nodes; and
(iii) resetting the self-potential value on the basis of the neighbor nodes' potential values contained in the route recovery responses received from the neighbor nodes, the neighbor nodes' potential values being updated in response to the route recovery request.

2. The routing method of claim 1, wherein the route recovery request comprises information of a route recovery request node generated in the original route recovery request, a hop count indicating a number of hops through which the route recovery request passed, and a propagation range indicating a number of hops to which the route recovery request is transmitted.

3. The routing method of claim 2, wherein resetting the self-potential value comprises:
checking, at each current node received the route recovery request, an existence of a reference node of which a potential value is less than the route recovery request node's potential value;
updating, when a reference node exists, the current node's potential value;
transmitting the updated current node's potential value to the route recovery request node; and
setting the route recovery request node's potential value with reference to the updated current node's potential value.

4. The routing method of claim 3, wherein the current node's potential value is set to a value between potential values of the route recovery request node and the reference node.

5. The routing method of claim 4, wherein the current node's potential is calculated by using an equation:

$$P = P_N + dP,$$

where P denotes the potential, $P_N$ denotes the potential of the reference node, and dP denotes a potential displacement, the potential displacement is calculated by an equation:

$$dP = (P_R - P_N)/(H_R + 1),$$

where $P_R$ denotes a potential of the route recovery request node, and $H_R$ denotes a the hop count indicating a number of hops from the route recovery request node to the current node.

6. The routing method of claim 5, wherein resetting the self-potential value further comprises:
storing, when no reference node exist, the route recovery request temporarily;
checking the propagation range of the route recovery request; and
relaying the route recovery request of which the hop count is modified according to the propagation range.

7. The routing method of claim 6, wherein checking an existence, storing the route recovery request, checking the propagation range, and relaying the route recovery request are repeated until the reference node is found.

8. The routing method of claim 7, wherein the route recovery request node relaying, if no updated neighbor node's potential value is received in response to the route recovery request in a predetermined time, the route recovery request of which propagation range is increased.

9. The routing method of claim 8, wherein the route recovery request node broadcasting, if no updated neighbor node's potential value is received in a predetermined number of times of retransmission of the route recovery request, a potential reset request over the entire network for all the nodes of the network to update the self-potential values to the destination node.

10. A mobile terminal as one of a plurality of mobile nodes establishing a mobile ad-hoc network, comprising:
a storage for storing mobile terminal's potential values to all nodes as destinations;
a radio frequency unit for transmitting a signal containing a mobile terminal's potential value to a destination node to neighbor nodes;
a potential configuration module for setting a value of the mobile terminal's potential value according to a reception of a route recovery request; and
a data transmission module for transmitting a packet destined to the destination node through a route established with nodes in a descending order of potential value;
wherein the mobile terminal's potential value is set with reference to the neighbor nodes' potential value to the destination node, and wherein the potential configuration module checks the potential values of the neighbor nodes and relays, when all the neighbor nodes' potential values are greater the mobile terminal's potential value, the route recovery request to the neighbor nodes.

11. The mobile terminal of claim 10, wherein the route recovery request comprises information of a route recovery request node generated the original route recovery request, a hop count indicating a number of hops through which the route recovery request passed, and a propagation range indicating a number of hops to which the route recovery request is transmitted.

12. The mobile terminal of claim 11, wherein the potential configuration module checks an existence of a reference node of which a potential value is less than the route recovery request node's potential value among the neighbor nodes; updates, when a reference node exists, the mobile terminal's potential value; and transmits the updated mobile terminal's potential value to the route recovery request node.

13. The mobile terminal of claim 12, wherein the potential configuration module sets the mobile terminal's potential value to a level between potentials of the route recovery request node and the reference node.

14. The mobile terminal of claim 13, wherein the potential configuration module increases, when no reference node exist, the propagation range of the route recovery request and relays the route recovery request having increased propagation range to the neighbor nodes.

15. The mobile terminal of claim 13, wherein the potential configuration module increases the mobile terminal's potential value to reduce the potential value margin when a potential value margin between the mobile terminal and the neighbor node of which potential value is lowest among the neighbor nodes' is greater than a predetermined value.

16. The mobile terminal of claim 13, wherein the potential configuration module maintains the mobile terminal's potential to be less than any of neighbor nodes' potential values, when the mobile terminal is the destination node; and the potential configuration module increases the potential value margin by decreasing the mobile terminal's potential value, when a potential value margin between the mobile terminal and the neighbor node of which potential is least among the neighbor nodes' is less than a predetermined value.

17. The mobile terminal of claim 13, wherein the potential configuration module decreases the potential margin by decreasing the mobile terminal's potential value, when a potential margin between the mobile terminal and the neighbor node of which potential is the least among the neighbor nodes' is greater than a predetermined value.

18. The method according to claim 1, wherein the packet is transmitted through a route having a lowest total potential value.

19. The mobile terminal of claim 13, wherein the mobile configuration module sets the potential value of a mobile terminal at a relatively lower value than neighboring nodes when closer to a destination node.

* * * * *